United States Patent Office.

RICHARD YEILDING, OF DETROIT, MICHIGAN.

Letters Patent No. 83,119, dated October 13, 1868.

---

IMPROVEMENT IN THE MANUFACTURE OF IRON AND STEEL.

---

The Schedule referred to in these Letters Patent and making part of the same.

---

*To all whom it may concern:*

Be it known that I, RICHARD YEILDING, of the city of Detroit, county of Wayne, and State of Michigan, have discovered a new and improved method of fusing and cleansing metal from its ore and all impurities, and of manufacturing pure iron and steel direct from the ore and crude metal, without remelting; and I do hereby declare that the following is a full and exact description of my process, reference being had to the accompanying specimens.

The nature of my discovery consists in the use of chemicals and oil for the purpose of fusing, purifying, and decarbonizing the crude metal, and making pure iron, and recarbonizing the iron again, and making it steel.

To enable others skilled in the art of manufacturing iron and steel to use my discovery, I will proceed to explain the process.

To manufacture iron, I place the ore or crude iron in a cupola or furnace, apply the fuel, (coke or charcoal,) and fuse the metal in the ordinary way; and when brought to a molten state, I take ten gallons of petroleum-oil, or any of its kindred fluids, except the baser residuum, mix with it one pound of finely-powdered saltpetre and one pound of pulverized potash, mixed thoroughly with the oil, and inject it into the bottom of the molten iron, through a suitable aperture, by mechanical force or gravity. This is sufficient for the purification of about a ton of iron.

This solution must be applied gradually, and very slowly. The combustion of this will cause an immediate flux of the molten mass, separating the carbon and impurities from the iron, leaving it pure, decarbonized iron, and both malleable and ductile.

The length of time required for the purification of the iron depends much upon the quality of the ore, and the amount of impurities it contains—usually about four hours. The operator can judge when the iron is purified sufficiently for the purpose for which he wishes to apply it, by the color of the blaze coming from the iron; for when the iron is cleansed from all impurities, the blaze becomes of a scarlet-red color, and the iron becomes thicker in the furnace, and requires greater heat to keep it fluid. When it assumes this appearance, it is pure, decarbonized iron, and may be drawn off and run into ingots, or at once put into any desired shape, by the application of the tilt-hammer or roller.

If I now wish to convert this into carbonized steel, I continue the iron in its molten state, discontinue the use of the chemicals described above, and apply a solution of ten gallons of oil and one pound of prussiate of potash in the same manner as the first was applied, closing the top of the furnace, so as to exclude the atmospheric air. The combustion of the oil and prussiate of potash will create a carbonic gas that will penetrate the entire mass of iron, replace the carbon that has been thrown out in the process of purification of the iron, and it is thus at once converted into steel.

The length of time required to convert such iron into steel depends much on the temper desired. A mild-tempered steel may be produced in this way in thirty minutes, and a very highly-carbonized steel in two hours. This steel being sufficiently carbonized, it is ready to be drawn off and worked into bars, or into any desired shape.

If I wish to convert iron into steel that cannot be annealed by heat or friction, (heat below that required to fuse it,) instead of using the prussiate of potash, I use the oxide of copper, oxide of zinc, and corrosive sublimate, in the same manner as is described for the manufacture of carbonized steel.

The time required for changing iron into this kind of steel need not exceed one hour; and this may be readily moulded, like cast-iron, into any article that cast-iron may be moulded. The proportion of these oxides is one pound of each to ten gallons of oil. They should all be finely pulverized, and mixed with the oil.

This steel is admirably adapted for tools that are to be used where they are exposed to heat, friction, or heavy blows, for it is possessed of greater hardness and tenacity than other steel, and therefore has greater powers of resistance; and when used for edged tools, its powers of resistance and durability are wonderful. Being of a closer grain, finer texture, and greater tenacity, it is of the utmost value for many purposes.

What I claim as my discovery, and desire to secure by Letters Patent, is—

1. The process of fusing and refining metal, and decarbonizing iron.

2. The converting of iron into carbonized steel.

3. The converting of iron into unannealable steel, and the use of the foregoing articles, in the manner and for the purposes herein set forth, and the general combination of the principles, and the use of the articles, combined and separately, and for the use of the oil alone, in the manner and for the purposes set forth in the foregoing specifications.

RICHARD YEILDING.

Witnesses:
ARTHUR TREDWAY,
A. J. SQUIRE.